United States Patent
Dennis-Pelcher et al.

(10) Patent No.: US 12,234,341 B2
(45) Date of Patent: Feb. 25, 2025

(54) CONDUCTIVE RUBBER COMPOSITIONS AND ARTICLES COMPOSED OF THE SAME

(71) Applicant: The Goodyear Tire & Rubber Company, Akron, OH (US)

(72) Inventors: Robert Vincent Dennis-Pelcher, Uniontown, OH (US); Junling Zhao, Hudson, OH (US); Aaron Patrick Murray, Chardon, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 26 days.

(21) Appl. No.: 17/938,113

(22) Filed: Oct. 5, 2022

(65) Prior Publication Data

US 2023/0183447 A1    Jun. 15, 2023

Related U.S. Application Data

(60) Provisional application No. 63/289,669, filed on Dec. 15, 2021.

(51) Int. Cl.
| | |
|---|---|
| C08K 3/04 | (2006.01) |
| C08K 7/06 | (2006.01) |
| C08L 7/00 | (2006.01) |
| C08L 9/08 | (2006.01) |
| C08L 47/00 | (2006.01) |
| H01B 1/18 | (2006.01) |

(52) U.S. Cl.
CPC ............ C08K 3/04 (2013.01); C08K 7/06 (2013.01); C08L 7/00 (2013.01); C08L 9/08 (2013.01); C08L 47/00 (2013.01); H01B 1/18 (2013.01); C08K 2201/005 (2013.01); C08K 2201/006 (2013.01); C08K 2201/011 (2013.01); C08L 2203/20 (2013.01)

(58) Field of Classification Search
CPC ..................................................... C08K 3/04
See application file for complete search history.

(56) References Cited

U.S. PATENT DOCUMENTS

| | | | | |
|---|---|---|---|---|
| 4,642,202 | A * | 2/1987 | Railsback | H01B 1/22 524/495 |
| 6,228,929 | B1 * | 5/2001 | Larson | C08L 23/22 524/495 |
| 6,269,854 | B1 * | 8/2001 | Matsuo | B60C 11/005 152/DIG. 2 |
| 6,443,198 | B1 | 9/2002 | Koch et al. | |
| 6,444,069 | B1 | 9/2002 | Koch et al. | |
| 6,546,982 | B1 | 4/2003 | Brown et al. | |
| 6,746,227 | B2 | 6/2004 | Helle et al. | |
| 6,885,291 | B1 | 4/2005 | Pollack et al. | |
| 6,889,153 | B2 | 5/2005 | Dietiker | |
| 7,280,036 | B2 | 10/2007 | Kafrawy | |
| 7,334,462 | B2 | 2/2008 | Robert | |
| 8,062,017 | B2 | 11/2011 | Clausse | |
| 8,596,117 | B2 | 12/2013 | Wilson et al. | |
| 8,996,239 | B2 | 3/2015 | Orlewski | |
| 9,016,118 | B2 | 4/2015 | Townsend et al. | |
| 9,090,756 | B2 | 7/2015 | Du et al. | |
| 9,283,817 | B2 | 3/2016 | Sandstrom et al. | |
| 9,352,615 | B2 | 5/2016 | Djelloul-Mazouz et al. | |
| 9,593,227 | B2 * | 3/2017 | Shigeta | C08K 3/041 |
| 9,649,889 | B2 | 5/2017 | Engel et al. | |
| 2007/0245819 | A1 | 10/2007 | Robert | |
| 2009/0114321 | A1 * | 5/2009 | Nakamura | B60C 1/0016 152/152.1 |
| 2010/0078194 | A1 * | 4/2010 | Bhatt | C08K 3/041 977/932 |
| 2013/0109799 | A1 | 5/2013 | Weber | |
| 2014/0117290 | A1 | 5/2014 | Kok Chong | |
| 2014/0353556 | A1 | 12/2014 | Shigeta et al. | |
| 2014/0365069 | A1 | 12/2014 | Orlewski | |
| 2015/0174969 | A1 * | 6/2015 | Forciniti | B60C 9/1835 152/153 |
| 2017/0001399 | A1 | 1/2017 | Dyrlund et al. | |
| 2019/0184773 | A1 | 6/2019 | Saito | |

(Continued)

FOREIGN PATENT DOCUMENTS

| | | |
|---|---|---|
| CN | 110408030 A | 11/2019 |
| CN | 111499945 A | 8/2020 |

(Continued)

OTHER PUBLICATIONS

Extended Search Report issued in the corresponding European application received by Applicant on May 11, 2023.
Youping, et al., "Study on Silicon Rubber Filled with HG Conductive Carbon Black," vol. 19, Issue. 5, pp. 4-6, 1998.

(Continued)

*Primary Examiner* — William D Young
(74) *Attorney, Agent, or Firm* — Edward T. Kennedy

(57) ABSTRACT

Described herein are conductive rubber compositions including a rubber component and one or more electrically conductive carbon compounds. In another aspect, the conductive rubber compositions can be prepared by first adding the one or more conductive carbon components into the polymer phase, thereby creating a filler network in the continuous polymer phase in the finished product. In a further aspect, the conductive carbon component can be or include one or more of the following: carbon black, a short carbon fiber, graphite powder, or graphene powder. Following mixing, the conductive rubber compositions can optionally be vulcanized. The conductive rubber compositions have good mechanical properties and electrical resistivity and can be processed using existing equipment.

14 Claims, No Drawings

(56) References Cited

U.S. PATENT DOCUMENTS

| | | |
|---|---|---|
| 2019/0359010 A1 | 11/2019 | Setokawa et al. |
| 2020/0047566 A1 | 2/2020 | Kim et al. |
| 2020/0354547 A1 | 11/2020 | Mikolajczak et al. |
| 2022/0088972 A1 | 3/2022 | Setokawa et al. |
| 2022/0185033 A1 | 6/2022 | West et al. |

FOREIGN PATENT DOCUMENTS

| | | |
|---|---|---|
| DE | 19745734 A1 | 4/1999 |
| DE | 20216290 U1 | 1/2003 |
| DE | 102007001279 | 7/2008 |
| DE | 102010000003 A1 | 7/2011 |
| GB | 1457157 A | 12/1976 |
| KR | 102124829 B1 | 6/2020 |

OTHER PUBLICATIONS

Lui, Zhuo-Dian, et al., "Resistivity Temperature Dependence of Force-sensitive Sensing Composites Filled with Mixed Conductive Filler," Instrument Technique and Sensor, pp. 28-30 and 33, Nov. 2012.

Office Action issued for CN202211612200.3 on Dec. 31, 2024.

\* cited by examiner

CONDUCTIVE RUBBER COMPOSITIONS AND ARTICLES COMPOSED OF THE SAME

BACKGROUND

Numerous applications in the computing, military, medical device, telecommunications, and transportation fields require a conductive rubber compound. Although several means have been proposed to achieve a rubber composition to meet the diverse needs of these industries, maintaining acceptable mechanical reinforcement properties has proven be difficult.

Rubbers are electrically insulating materials. In order to make rubber electrically conductive, continuous pathways of electrically conductive particles must be established in the rubbers. However, conductive fillers significantly affect the electrical and mechanical characteristics of rubbers.

Furthermore, conductive carbon compounds are difficult to mix with high molecular weight rubbers and other polymers. In turn, uneven mixing may result in uneven distribution of the conductive carbons in articles made from the compositions, which can affect the conductivity of the rubber compositions as well as their mechanical strength. Long carbon fibers may provide the needed mechanical strength but lack elasticity and can break.

Despite advances in the development of conductive rubbers, there is still a scarcity of conductive rubber compositions that have acceptable mechanical properties, can be processed with existing equipment, and maintain their conductivity and do not degrade over time. These needs and other needs are satisfied by the present disclosure.

SUMMARY

Described herein are conductive rubber compositions including a rubber component and one or more electrically conductive carbon compounds, wherein the conductive rubber composition has an uncured or cured electrical resistance at 23° C. less than about 10 megaohms (MΩ) when formed into a wire about 10 inches (254 mm) long and 2 mm in diameter. In another aspect, the conductive rubber compositions can be prepared by first adding the one or more conductive carbon components into the polymer phase, thereby creating a filler network in the continuous polymer phase in the finished product. In a further aspect, the conductive carbon component can be or include one or more of the following: carbon black, a short carbon fiber, graphite powder, or graphene powder. Following mixing, the conductive rubber compositions can optionally be vulcanized. The conductive rubber compositions have good mechanical properties and electrical resistivity and can be processed using existing equipment. Also disclosed are articles comprising the conductive rubber compositions.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

DETAILED DESCRIPTION

In one aspect, disclosed herein are conductive rubber compositions including a rubber component and one or more electrically conductive carbon compounds. In another aspect, the conductive rubber compositions can be prepared by first adding the one or more conductive carbon components into the polymer phase, thereby creating a filler network in the continuous polymer phase in the finished product. In a further aspect, the conductive carbon component can be or include one or more of the following: carbon black, a short carbon fiber, graphite powder, or graphene powder. Following mixing, the conductive rubber compositions can optionally be vulcanized. The conductive rubber compositions have acceptable mechanical properties and conductivity and can be processed using existing equipment.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a conductive carbon compound," "a rubber component," or "an oil," include, but are not limited to, mixtures or combinations of two or more such conductive carbon compounds, rubber components, or oils, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to Cy' as well as the range greater than 'x' and less than Cy'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and cy' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the term "effective amount" refers to an amount that is sufficient to achieve the desired modification of a physical property of the composition or material. For example, an "effective amount" of a conductive carbon compound refers to an amount that is sufficient to achieve the desired improvement in the property modulated by the formulation component, e.g. achieving the desired level of resistivity. The specific level in terms of wt % in a composition required as an effective amount will depend upon a variety of factors including the amount and type of rubber component, molecular weight of the rubber component, form and dimensions of the conductive carbon compound, and end use of any articles made using the conductive rubber compositions.

As used herein, the terms "optional" or "optionally" means that the subsequently described event or circumstance can or cannot occur, and that the description includes instances where said event or circumstance occurs and instances where it does not.

"Electrical resistance" refers to how strongly a material, such as a conductive rubber, can oppose the flow of electric current. A material with a high electrical resistance is a better insulator, while a material with a low electrical resistance is a better conductor. Resistance can be measured using a standard meter such as, for examples, a FLUKE 117 true rms multimeter.

"Elongation at break" refers to the percentage of the original length of a rubber or elastomeric material to which the material is extended at rupture, when the material is subjected to a stretching or tensile force.

"Fiber" is a unit of matter, either natural or man-made that forms the basic element of filament, characterized by having a length at least 10 times its diameter or width.

"Modulus" refers to the tensile force at a specific elongation value (e.g. 10% modulus, 50% modulus, and the like) when a rubber or elastomeric material is subjected to a stretching or tensile motion.

"Mooney viscosity" refers to the shearing torque resisting rotation of a cylindrical metal disk or rotor embedded in rubber within a cylindrical cavity and is reported in arbitrary Mooney units. An exemplary procedure for determining Mooney viscosity can be found in standard test method ASTM D 1646.

"Phr" means parts by weight of a respective material per 100 parts by weight of rubber or elastomer.

"Storage modulus (G')" is a measurement of the stored deformation energy in an elastic manner in a viscoelastic material. In some aspects, a material having a higher degree of crosslinking will have a greater storage modulus.

"T25" refers to the curing time a rubber composition requires to reach 25% of ultimate elastic torque and is expressed in minutes with reference to a given temperature. "T90," meanwhile, is the time a rubber composition requires to reach 90% of ultimate elastic torque value. T25 and T90 can measured using a moving die rheometer and/or a rubber process analyzer.

"Zwick rebound" refers to a test of material elasticity. In this test, a force is applied to a material. A material that is perfectly elastic stores energy from this force and releases it when the force is removed. A material that is perfectly plastic absorbs the supplied energy. Rubber materials will typically have a Zwick rebound value reflecting degrees of plasticity and elasticity, and Zwick rebound values typically vary with temperature.

"Oil absorption number" as used herein refers to the number of cubic centimeters or mL of dibutyl phthalate (DBP) or paraffin oil absorbed by 100 g of carbon black under a standard set of conditions.

Unless otherwise specified, pressures referred to herein are based on atmospheric pressure (i.e. one atmosphere).

Rubber Components

In one aspect, the conductive rubber compositions disclose herein include a rubber component. In a further aspect, the rubber component can be natural rubber (NR), polyisoprene rubber (IR), a styrene butadiene rubber (SBR), a polybutadiene rubber (BR), a butyl or halobutyl rubber, an ethylene propylene rubber (EM), an ethylene-propylene diene rubber (EPDM), polychloroprene rubber (CR), a nitrile butadiene rubber (NBR) hydrogenated acrylonitrile butadiene rubber (HNBR), a silicone rubber (MQ), a thermoplastic rubber, or any combination thereof. In a further aspect, the butyl or halobutyl rubber can be isobutylene-isoprene rubber (IIR), brominated isobutylene-isoprene rubber (BIIR), chlorinated isobutylene-isoprene rubber (CIIR), brominated isobutylene-co-p-methylstyrene rubber (BIMS), or any combination thereof. In another aspect, the thermoplastic rubber can be a poly(styrene-butadiene-styrene) rubber (SBS), a thermoplastic elastomeric rubber (TPE), a melt-processable rubber (MPR), or any combination thereof. In one aspect, the thermoplastic elastomeric rubber can be a thermoplastic polyurethane rubber.

In one aspect, the conductive rubber composition includes a blend of two or more rubber components. In one aspect, and without wishing to be bound by theory, an electrically conductive system based on polymer blends can achieve a high electrical conductivity with lower filler content, thus alleviating difficulties with blending the carbon compounds in the polymers and reducing materials costs.

Molecular Weight

In one aspect, the rubber component can have a molecular weight ($M_w$) of from about $5 \times 10^4$ Da to about $3 \times 10^7$ Da, or from about $3 \times 10^5$ Da to about $5 \times 10^6$ Da, or of about $5 \times 10^4$ Da, $6 \times 10^4$ Da, $7 \times 10^4$ Da, $8 \times 10^4$ Da, $9 \times 10^4$ Da, $1 \times 10^5$ Da, $2 \times 10^5$ Da, $3 \times 10^5$ Da, $4 \times 10^5$ Da, $5 \times 10^5$ Da, $6 \times 10^5$ Da, $7 \times 10^5$ Da, $8 \times 10^5$ Da, $9 \times 10^5$ Da, $1 \times 10^6$ Da, $2 \times 10^6$ Da, $3 \times 10^6$ Da, $4 \times 10^6$ Da, $5 \times 10^6$ Da, $6 \times 10^6$ Da, $7 \times 10^6$ Da, $8 \times 10^6$ Da, $9 \times 10^6$ Da, $1 \times 10^7$ Da, $2 \times 10^7$ Da, or about $3 \times 10^7$ Da, or a combination of any of the foregoing values, or a range encompassing any of the foregoing values.

Molecular Weight Distribution

In another aspect, the rubber component can have a molecular weight distribution ($M_w/M_n$) of from about 1 to about 10, or from about 2.1 to about 10, or from about 3.9 to about 8.2, or of about 1, 1.25, 1.5, 1.75, 2, 2.1, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, 8, 8.25, 8.5, 8.75, 9, 9.25, 9.5, 9.75, or about 10, or a combination of any of the foregoing values, or a range encompassing any of the foregoing values.

Mooney Viscosity

In one aspect, the rubber component has a Mooney viscosity UML of from about 0.01 to about 150, or of about 0.01, 0.05, 0.1, 0.5, 1, 2, 5, 10, 15, 20, 25, 30, 35, 40, 45, 50, 55, 60, 65, 70, 75, 80, 85, 90, 95, 100, 105, 110, 115, 120, 125, 130, 135, 140, 145, or about 150, or a combination of any of the foregoing values, or a range encompassing any of the foregoing values. In another aspect, the rubber component has a Mooney viscosity UMS of from about 2 to about 150, or of about 2, 5, 10, 15, 20, 25, 30, 35, 40, 45, 50, 55, 60, 65, 70, 75, 80, 85, 90, 95, 100, 105, 110, 115, 120, 125, 130, 135, 140, 145, or about 150, or a combination of any of the foregoing values, or a range encompassing any of the foregoing values.

Glass Transition Temperature ($T_g$)

In one aspect, the rubber component has a glass transition temperature of from about
−110° C. to about 30° C., or from about −75° C. to about −25° C., or of about −110, −105, −100, −95,
−90, −85, −80, −75, −70, −65, −60, −55, −50, −45, −40, −35, −30, −25, −20, −15, −10, −5, 0, 5, 10, 15, 20, 25, or about 30° C., or a combination of any of the foregoing values, or a range encompassing any of the foregoing values.

Exemplary Rubber Components

In one aspect, in the disclosed conductive rubber compositions, the rubber component includes a natural rubber having a molecular weight of from about $3 \times 10^4$ Da to about $3 \times 10^7$ Da and a glass transition temperature of from about −75° C. to about −65° C.

In one aspect, in the disclosed conductive rubber compositions, the rubber component includes a synthetic cis-1,4-polyisoprene rubber having a molecular weight of from about $2 \times 10^5$ Da to about $8 \times 10^5$ Da, a Mooney viscosity UML of about 75, and a glass transition temperature of from about −70° C. to about −60° C.

In one aspect, in the disclosed conductive rubber compositions, the rubber component includes an emulsion-polymerized styrene-butadiene rubber having a molecular weight of from about $1 \times 10^5$ Da to about $4 \times 10^5$ Da, a Mooney viscosity of about 50 UML, and a glass transition temperature of from about −60° C. to about −50° C.

In one aspect, in the disclosed conductive rubber compositions, the rubber component includes a solution-polymerized styrene-butadiene rubber having a molecular weight of from about $7 \times 10^4$ Da to about $8 \times 10^4$ Da, a Mooney viscosity UML of about 2.6, and a glass transition temperature of from about −30° C. to about −20° C.

Exemplary suitable rubber components include, but are not limited to, the following: TSR20 natural rubber, RSS Natural Rubber, NATSYN 2200, PLF1502, Exp SBR, and combinations thereof. In one aspect, TSR20 (Technically Specified Rubber) natural rubber is a block rubber available from several manufacturers consisting primarily of cis-1,4-polyisoprene and having a $T_g$ of −70° C., a molecular weight distribution of 4.59 to 8.11, a Mooney viscosity (UML) of from 88 to 99.2, and 20% max dirt. In another aspect, RSS (#2 Ribbed Smoked Sheet Rubber) natural rubber is a form of raw natural rubber available from several manufacturers and having a $T_g$ of −70° C., a molecular weight distribution of from 1.35 to 2.36, and a Mooney viscosity (UMS) of 80 to 142. In either of these aspects, the molecular weight range of the natural rubber can be from about $1 \times 10^7$ Da to about $3 \times 10^7$ Da. In still another aspect, NATSYN 2200 (Goodyear Chemical, Akron OH) is a synthetic high cis polyisoprene containing a non-staining antioxidant and having a $T_g$ of −64° C., an $M_n$ of $2.04 \times 10^5$ Da, an $M_w$ of $7.31 \times 10^3$ Da, a molecular weight distribution of 3.575, and a Mooney viscosity (UML) of 75. In one aspect, PLF1502 (PLIOFLEX 1502, Goodyear Chemical, Akron OH) is an emulsion polymerized styrene-butadiene copolymer (23.5% styrene, 12% vinyl, 55% trans, 10% cis) having a $T_g$ of −55° C., an $M_n$ of $1.01 \times 10^5$ Da, an $M_w$ of $4.03 \times 10^5$ Da, a molecular weight distribution of 3.99, and a Mooney viscosity (UML) of 50, with a non-staining antioxidant. In one aspect, Exp SBR is an experimental Li-solution based styrene-butadiene rubber having a $T_g$ of −26° C., an $M_n$ of $7.39 \times 10^4$ Da, an $M_w$ of $7.39 \times 10^4$ Da, a molecular weight distribution of 1.00, and a Mooney viscosity (UML) of 2.63.

Carbon Compounds

In one aspect, the conductive rubber compositions disclosed herein include an electrically conductive carbon component. Exemplary conductive carbon components are described below.

In one aspect, the one or more carbon components can be present in an amount of from about 20 phr to about 150 phr, or of from about 30 phr to about 100 phr, or of from about 40 phr to about 80 phr, or at about 20, 30, 40, 50, 60, 70, 80, 90, 100, 110, 120, 130, 140, or about 150 phr, or a combination of any of the foregoing values, or a range encompassing any of the foregoing values.

Carbon Black

In one aspect, the electrically conductive carbon component can be or include a carbon black. In another aspect, the carbon black can have an average particle size of from about 5 nm to about 100 nm, or from about 5 nm to about 50 nm, or of about 5, 10, 15, 20, 25, 30, 35, 40, 45, 50, 55, 60, 65, 70, 75, 80, 85, 90, 95, or about 100 nm, or a combination of any of the foregoing values, or a range encompassing any of the foregoing values.

In one aspect, the carbon black can have a BET surface area of from about 20 m$^2$/g to about 1700 m$^2$/g, or of from about 50 m$^2$/g to about 1500 m$^2$/g, or of about 20, 50, 100, 200, 300, 400, 500, 600, 700, 800, 900, 1000, 1100, 1200, 1300, 1400, 1500, 1600, or about 1700 m$^2$/g, or a combination of any of the foregoing values, or a range encompassing any of the foregoing values.

In another aspect, the carbon black can have an external surface area based on statistical thickness method (STSA) of from about 20 to about 1200 m$^2$/g, or about 100 m$^3$/g to about 300 m$^3$/g, or of from about 150 m$^3$/g to about 200 m$^3$/g, or of about 20, 25, 50, 75, 100, 125, 150, 175, 200, 225, 250, 275, 300, 350, 400, 450, 500, 550, 600, 650, 700, 750, 800, 850, 900, 950, 1000, 1050, 1100, 1150, or about 1200 m$^3$/g, or a combination of any of the foregoing values, or a range encompassing any of the foregoing values.

In another aspect, the carbon black can have an oil absorption number of from about 500 mL/100 g to about 20 mL/100 g, or from about 500 mL/100 g to about 80 mL/100 g, or of about 500, 450, 400, 350, 300, 250, 200, 150, 100, or about 80 mL/100 g, or a combination of any of the foregoing values, or a range encompassing any of the foregoing values.

Exemplary suitable carbon blacks include, but are not limited to, the following: an N299 ASTM grade carbon black, PRINTEX XE2B (Orion Engineered Carbons, Luxembourg), PROPEL X22 (Cabot Corporation, Boston MA), or any combination thereof. In one aspect, PRINTEX XE2B has an oil absorption number of 410 mL/100 g as measured by standard test method ASTM D 2414, a BET surface area of 1100 m$^2$/g as measured by ASTM D 6556, and an average primary particle size of 30 nm based on ASTM D 3849. In another aspect, PROPEL X22 has iodine of 230 mg/g according to standard test method ASTM D 1510, external surface area based on statistical thickness method (STSA) of 173 m$^2$/g according to standard test method ASTM D6556, compressed sample oil absorption number (COAN) of 100 mL/100 g according to standard test method ASTM D3493, and a tint of 150% ITRB according to standard test method ASTM D 3265. Additional useful carbon blacks include BLACK PEARLS 2000 carbon black and Vulcan XC-72 (BOTH FROM Cabot Corporation, Boston MA), CONDUCTEX 975 and CONDUCTEX SC (Columbian Chemicals, Hamilton ON Canada), and PRINTEX XE2, PRINTEX L, AND PRINTEX L6 (Orion Engineered Carbons, Luxembourg).

Short Carbon Fiber

In one aspect, the electrically conductive carbon component can be or include a short carbon fiber. In one aspect, the short carbon fiber can be a carbon fiber, chopped carbon fiber yarn, multi-walled carbon nanotubes (MWCNTs), single-walled carbon nanotubes (SWCNTs), or any combination thereof. In one aspect, the short carbon fiber has a diameter of from about 1 nm to about 1000 nm, or of from about 150 nm to about 600 nm, or of about 1, 10, 25, 50, 100, 150, 200, 250, 300, 350, 400, 450, 500, 550, 600, 650, 700, 750, 800, 850, 900, 950, or about 1000 nm, or a combination of any of the foregoing values, or a range encompassing any of the foregoing values.

In another aspect, the short carbon fiber can have a length of from about 1 µm to about 1×10$^4$ µm, or of about 1, 100, 500, 1000, 2000, 3000, 4000, 5000, 6000, 7000, 8000, 9000, or about 10,000 µm, or a combination of any of the foregoing values, or a range encompassing any of the foregoing values.

In still another aspect, the short carbon fiber can have an average lateral length to thickness ratio of from about 10:1 to about 10,000:1, or of about 10:1, 50:1, 100:1, 500:1, 1000:1, 2000:1, 3000:1, 4000:1, 5000:1, 6000:1, 7000:1, 8000:1, 9000:1, or about 10,000:1, or a combination of any of the foregoing values, or a range encompassing any of the foregoing values.

An exemplary short carbon fiber useful herein has a diameter of from about 150 to about 600 nm depending on the grade, a BET surface area of from about 120–190 m$^2$/g and a length of greater than 1 µm.

Blends

In some aspect, the carbon component can include a blend. In one aspect, the one or more carbon components consists of a blend of carbon black and graphite powder, or of carbon black and graphene powder.

In another aspect, the one or more carbon components includes a blend of carbon black and a short carbon fiber. In one aspect, and without wishing to be bound by theory, the inclusion of a blend carbon black and short carbon fibers may provide additional advantages in terms of conductivity of the mixtures. In one aspect, the carbon black can improve interfiber contacts by forming particle bridges, while carbon fibers can aid the transport of electrons over long distances, thus establishing a continuous pathway for electrical conduction in the disclosed compositions. In some aspects, including a blend of carbon black and a short carbon fiber may result in the formation of a different conductive network structure in a blend of polymers versus a rubber composition based on a single polymer.

Further in this aspect, the short carbon fiber can be from about 5 phr to about 80 phr, or from about 20 phr to about 40 phr, or can be about 5, 10, 15, 20, 25, 30, 35, 40, 45, 50, 55, 60, 65, 70, 75, or about 80 phr, or a combination of any of the foregoing values, or a range encompassing any of the foregoing values, and the carbon black can be from about 15 phr to about 70 phr, or from about 10 phr to about 60 phr, or about 10, 15, 20, 25, 30, 35, 40, 45, 50, 55, 60, 65, or about 70 phr, or a combination of any of the foregoing values, or a range encompassing any of the foregoing values.

In an aspect, the electrically conductive carbon component can include an ASTM N299 grade carbon black and a short carbon fiber having a diameter of from about 1 nm to about 1000 nm and a length of from about 1 µm to about 1×10$^4$ µm.

In another aspect, the electrically conductive carbon component can include a carbon black having an oil absorption number of about 100 mL/100 g and a short carbon fiber having a diameter of from about 1 nm to about 1000 nm and a length of from about 1 µm to about 1×10$^4$ µm.

In another aspect, the electrically conductive carbon component can include a carbon black having an average particle size of about 30 nm and a short carbon fiber having a diameter of from about 1 nm to about 1000 nm and a length of from about 1 µm to about 1×10$^4$ µm.

Additional Components

In one aspect, the conductive rubber compositions disclosed herein can additionally contain one or more additional components in addition to those already described. In an aspect, the additional component can be selected from antioxidants and/or antiozonants, oils, zinc oxide, fatty acids, sulfur, an accelerator, a retarder, and combinations thereof.

Antioxidant and/or Antiozonant

In one aspect, the conductive rubber compositions disclosed herein include at least one antioxidant, at least one anti-ozonant, or any combination thereof. In one aspect, an antiozonant can protect the rubber compositions from ozone ($O_3$). In another aspect, the antiozonant can be a material such as a wax that travels to the surface of a rubber article to protect the article against attack from ozone. Suitable examples of antiozonant include, but are not limited to, Antiozite 67P (Vanderbilt Chemicals, LLC, Norwalk CT USA). In one aspect, the antioxidant is a non-staining antioxidant. In another aspect, the antioxidant can be an amine antioxidant, a diphenylamine antioxidant, a polymeric dihydroquinoline, or any combination thereof. In still another aspect, the antioxidant or antiozonant can be present in an amount of from about 1 phr to about 2 phr in the compositions, or at about 1, 1.1, 1.2, 1.3, 1.4, 1.5, 1.6, 1.7, 1.8, 1.9, or about 2 phr, or a combination of any of the foregoing values, or a range encompassing any of the foregoing values.

Oil

In one aspect, the conductive rubber compositions include an oil. In another aspect, the oil is a standard rubber processing oil, such as, for example, an aromatic rubber process oil, a paraffinic rubber process oil, a naphthenic rubber process oil, or any combination thereof. In an aspect, the rubber process oil can improve the dispersion of fillers and flow characteristics of the rubber composition during processing. In one aspect, the oil can be present in an amount of from about 4 phr to about 30 phr, or at about 4, 5, 6, 7, 8, 9, 10, 11, 12, 13, 14, 15, 16, 17, 18, 19, 20, 21, 22, 23, 24, 25, 26, 27, 28, 29, or about 30 phr, or a combination of any of the foregoing values, or a range encompassing any of the foregoing values.

Zinc Oxide

In one aspect, the conductive rubber compositions disclosed herein include zinc oxide. In another aspect, zinc oxide is a useful activator for rubber vulcanization. In one aspect, the zinc oxide is present in the conductive rubber compositions at from about 1 phr to about 5 phr, or at about 1, 2, 3, 4, or about 5 phr, or a combination of any of the foregoing values, or a range encompassing any of the foregoing values. In one aspect, the zinc oxide is present in an amount of about 3 phr Fatty Acid In one aspect, the conductive rubber compositions disclosed herein include a fatty acid. In another aspect, the fatty acid can be stearic acid, palmitic acid, oleic acid, or any combination thereof. In a further aspect, the fatty acid can be present in the conductive rubber compositions in an amount of from about 1 phr to about 5 phr, or at about 1, 1.1, 1.2, 1.3, 1.4, 1.5, 1.6, 1.7, 1.8, 1.9, 2, 2.25, 2.5, 2.75, 3, 3.25, 3.5, 3.75, 4, 4.25, 4.5, 4.75, or about 5 phr, or a combination of any of the foregoing values, or a range encompassing any of the foregoing values.

Sulfur

In one aspect, the conductive rubber compositions disclosed herein include sulfur. In another aspect, the sulfur can be present in an amount of from 0.5 to about 5 phr, or from about 0.5 to about 3 phr, or at about 0.5, 1, 1.5, 2, 2.5, 3, 3.5, 4, 4.5, or about 5 phr, or a combination of any of the foregoing values, or a range encompassing any of the foregoing values. In one aspect, the sulfur is present in an amount of about 1.8 phr. In one aspect, sulfur can be useful for forming crosslinks between rubber chains during the vulcanization process.

Accelerator

In an aspect, the conductive rubber compositions include an accelerator. In one aspect, the accelerator can be a sulfenamide sulfur cure accelerator. In another aspect, the accelerator is present in an amount of from about 0.5 to about 5 phr, or from about 1 to about 2 phr, or at about 0.5, 1, 1.5, 2, 2.5, 3, 3.5, 4, 4.5, or about 5 phr, or a combination of any of the foregoing values, or a range encompassing any of the foregoing values. In one aspect, the accelerator is present at about 1.2 phr.

Retarder

In one aspect, the conductive rubber compositions include a retarder. In another aspect, the retarder can be N-(cyclohexylthio)phthalimide. In still another aspect, the retarder can be present in an amount of from about 0.05 to about 0.5 phr, or from about 0.1 phr to about 0.3 phr, or at about 0.05, 0.1, 0.15, 0.2, 0.25, 0.3, 0.35, 0.4, 0.45, or about 0.5 phr, or a combination of any of the foregoing values, or a range encompassing any of the foregoing values.

In one aspect, the retarder can be useful for preventing premature vulcanization during rubber processing. An exemplary retarder can be Vantard PVI (Vanderbilt Chemicals, LLC, Norwalk CT USA).

Methods for Preparing the Conductive Rubber Compositions

In one aspect, the disclosed conductive rubber compositions can be made by mixing one or more additives into the rubber or polymeric base of the rubber compositions. In a further aspect, heating the rubber or polymeric base of the rubber compositions softens the rubber or polymeric base enough to allow for the mixing of additives into the rubber composition. In still another aspect, the additives are discussed herein and include one or more of an antioxidant or antiozonant, oil, zinc oxide, fatty acid, sulfur, accelerator, retarder, and one or more conductive carbon components.

In one aspect, the additives can be mixed into the rubber compositions sequentially or simultaneously. In some aspects, a masterbatch can be prepared containing nonreactive additives such as the conductive carbon component, to ensure thorough mixing of the conductive carbon component prior to the beginning of vulcanization. In a further aspect, following preparation of the masterbatch, vulcanization additives (e.g., sulfur, zinc oxide) can be added to the masterbatch.

In some aspects, the rubber compositions may further be shaped prior to or during the early stages of vulcanization by a method including, but not limited to, extrusion, calendaring, molding, casting, another rubber processing method, or any combination thereof.

In some aspects, processing aids can be used, such as, for example, waxes including but not limited to microcrystalline and paraffinic waxes, in a range, for example, of from about 1 phr to about 5 phr, or from about 1 phr to about 3 phr, or at about 1, 2, 3, 4, or about 5 phr, or a combination of any of the foregoing values, or a range encompassing any of the foregoing values, if used.

In another aspect, resins, usually as tackifiers, can be incorporated into the rubber compositions where the tackifiers or resins are compounds such as, for example, synthetic hydrocarbon and natural resins in a range of, for example, from about 1 phr to 5 phr or from about 1 phr to about 3 phr, or at about 1, 2, 3, 4, or about 5 phr, or a combination of any of the foregoing values, or a range encompassing any of the foregoing values, if used.

In some aspects, a curative can be present as sulfur together with one or more sulfur cure accelerator(s). In another aspect, for sulfur and accelerator(s) curatives, the amount of sulfur used can be, for example, from about 0.5 phr about 5 phr, or from about 0.5 to about 3 phr, or at about 0.5, 1, 1.5, 2, 2.5, 3, 3.5, 4, 4.5, or about 5 phr, or a combination of any of the foregoing values, or a range encompassing any of the foregoing values; and the accelerator(s), often of the sulfenamide type, is (are) used in a range of from about 0.5 phr to about 5 phr, or from about 1 phr to about 2 phr, or at about 0.5, 1, 1.5, 2, 2.5, 3, 3.5, 4, 4.5, or about 5 phr, or a combination of any of the foregoing values, or a range encompassing any of the foregoing values.

In still another aspect, components of the compositions, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., or at about 145, 150, 155, 160, 165, 170, 175, 180, or about 185° C., or a combination of any of the foregoing values, or a range encompassing any of the foregoing values, and such mixing stages are typically referred to as non-productive mixing stages. In a further aspect, the sulfur and accelerators, and optionally one or more retarders and optionally one or more antidegradants, are mixed therewith to a temperature of, for example, from about 90° C. to about 120° C., or at about 90, 95, 100, 105, 110, 115, or about 120° C., or a combination of any of the foregoing values, or a range encompassing any of the foregoing values, in a second stage that is typically referred as a productive mix stage. Such mixing procedures are well known to those having skill in such art.

Properties of the Conductive Rubber Compositions

Uncured Storage Modulus

In one aspect, the disclosed conductive rubber composition can have an uncured storage modulus at 15% train, 100° C., and 0.83 Hz, of from about 185 kPa to about 1100 kPa, or of about 185, 200, 300, 400, 500, 600, 700, 800, 900, 1000, or about 1100 kPa, or a combination of any of the foregoing values, or a range encompassing any of the foregoing values. In a further aspect, the uncured storage modulus can be measured using a rubber process analyzer.

Storage Modulus

In one aspect, the disclosed conductive rubber compositions can have a storage modulus at 1% strain, 100° C., and 11 Hz of from about 1.1 MPa to about 4 MPa, or of about 1.1, 1.5, 2, 2.5, 3, 3.5, or about 4 MPa, or a combination of any of the foregoing values, or a range encompassing any of the foregoing values.

In one aspect, the disclosed conductive rubber compositions can have a storage modulus at 10% strain, 100° C., and 11 Hz of from about 0.8 MPa to about 3 MPa, or of about 0.8, 1, 1.2, 1.4, 1.6, 1.8, 2, 2.2, 2.4, 2.6, 2.8, or about 3 MPa, or a combination of any of the foregoing values, or a range encompassing any of the foregoing values.

In one aspect, the disclosed conductive rubber compositions can have a storage modulus at 50% strain, 100° C., and 11 Hz of from about 0.35 MPa to about 1 MPa, or of about 0.35, 0.4, 0.5, 0.6, 0.7, 0.8, 0.9, or about 1 MPa, or a combination of any of the foregoing values, or a range encompassing any of the foregoing values.

In any of these aspects, storage modulus can be measured using a rubber process analyzer.

Modulus

In an aspect, the disclosed conductive rubber compositions can have a 10% modulus of from about 0.4 MPa to about 2.5 MPa, or of about 0.4, 0.5, 1, 1.5, 2, or about 2.5 MPa, or a combination of any of the foregoing values, or a range encompassing any of the foregoing values.

In another aspect, the disclosed conductive rubber compositions can have a 50% modulus of from about 1.25 MPa to about 3.5 MPa, or of about 1.25, 1.5, 2, 2.5, 3, or about 3.5 MPa, or a combination of any of the foregoing values, or a range encompassing any of the foregoing values.

In still another aspect, the disclosed conductive rubber compositions can have a 100% modulus of from about 2 MPa to about 5.2 MPa, or of about 2, 2.5, 3, 3.5, 4, 4.5, 5, or about 5.2 MPa, or a combination of any of the foregoing values, or a range encompassing any of the foregoing values.

In one aspect, the disclosed conductive rubber compositions can have a 200% modulus of from about 3 MPa to about 12 MPa, or of about 3, 4, 5, 6, 7, 8, 9, 10, 11, or about 12 MPa, or a combination of any of the foregoing values, or a range encompassing any of the foregoing values.

In an aspect, the disclosed conductive rubber compositions can have a 300% modulus of from about 4 MPa to about 13.5 MPa, or of about 4, 5, 6, 7, 8, 9, 10, 11, 12, 13, or about 13.5 MPa, or a combination of any of the foregoing values, or a range encompassing any of the foregoing values.

In any of these aspects, the modulus can be measured using a tensile test based on ASTM D 412.

Tensile Strength

In one aspect, the conductive rubber compositions disclosed herein can have a tensile strength of above about 2 MPa, or of from about 2 MPa to about 30 MPa, or of about 2, 2.5, 3, 3.5, 4, 4.5, 5, 10, 15, 20, 25, or about 30 MPa, or a combination of any of the foregoing values, or a range encompassing any of the foregoing values. In one aspect, tensile strength can be measured using a tensile test based on ASTM D 412.

Elongation at Break

In one aspect, the conductive rubber compositions disclosed herein can have an elongation at break of above about 200%, or of from about 200% to about 800%, or of about 200, 250, 300, 350, 400, 450, 500, 550, 600, 650, 700, 750, or about 800%, or a combination of any of the foregoing values, or a range encompassing any of the foregoing values. In one aspect, elongation at break can be measured using a tensile test based on ASTM D 412.

Cured or Uncured Electrical Resistance

In one aspect, the conductive rubber compositions disclosed herein can be formed into a wire. In another aspect, the wire can be about 10 in (254 mm) long and about 2 mm in diameter. In a further aspect, such a wire can have a cured or uncured electrical resistance at 23° C. of from about 5 ohms ($\Omega$) to about 10 megaohms (M$\Omega$), or from about 5$\Omega$ to about an upper limit of 100 kiloohms (k$\Omega$), or of about 5, 25 $\Omega$, 50 $\Omega$, 75 $\Omega$, 100 $\Omega$, 200 $\Omega$, 300 $\Omega$, 400 $\Omega$, 500 $\Omega$, 600 $\Omega$, 700 $\Omega$, 800$\Omega$, or 900$\Omega$, or 1 k$\Omega$, 5 k$\Omega$, 10 k$\Omega$, 20 k$\Omega$, 30 k$\Omega$, 40 k$\Omega$, 50 k$\Omega$, 60 k$\Omega$, 70 k$\Omega$, 80 k$\Omega$, 90 k$\Omega$, 100 k$\Omega$, 200 k$\Omega$, 300 k$\Omega$, 400 k$\Omega$, 500 k$\Omega$, 600 k$\Omega$, 700 k$\Omega$, 800 k$\Omega$, or 900 k$\Omega$, or 1 M$\Omega$, 2 M$\Omega$, 3 M$\Omega$, 4 M$\Omega$, 5 M$\Omega$, 6 M$\Omega$, 7 M$\Omega$, 8 M$\Omega$, 9 M$\Omega$, or about 10 M$\Omega$, or a combination of any of the foregoing values, or a range encompassing any of the foregoing values. In one aspect, electrical resistance can be measured using a standard multimeter. In another aspect, the conductive rubber compositions have a resistivity of less than about 800 $\Omega$m, or about 10, 50, 100, 150, 200, 250, 300, 350, 400, 450, 500, 550, 600, 650, 700, 750, or about 800 $\Omega$m, or a combination of any of the foregoing values, or a range encompassing any of the foregoing values.

In an aspect, conductivity and/or resistance of the conductive rubbers is enhanced in the disclosed compositions when the surface area, particle size, and structure (e.g. porosity) of the carbon component are higher.

T25 and T90

In an aspect, the conductive rubber compositions disclosed herein can have a T25 as measured using a moving die rheometer standard test at 150° C. for 60 min of from about 1 min to about 30 min, or of about 1, 2, 3, 4, 5, 6, 7, 8, 9, 10, 11, 12, 13, 14, 15, 16, 17, 18, 19, 20, 21, 22, 23, 24, 25, 26, 27, 28, 29, or about 30 min, or a combination of any of the foregoing values, or a range encompassing any of the foregoing values.

In another aspect, the conductive rubber compositions disclosed herein can have a T90 as measured using a moving die rheometer standard test at 150° C. for 60 min of from about 5 min to about 60 min, or of about 5, 10, 15, 20, 25, 30, 35, 40, 45, 50, 55, or about 60 min, or a combination of any of the foregoing values, or a range encompassing any of the foregoing values.

In one aspect, T25 and T90 can be measured using a rubber process analyzer and/or a moving die rheometer standard test (using ASTM D 5289 and/or ISO 6502).

Zwick Rebound

In one aspect, the conductive rubber compositions can have a Zwick rebound at 23° C. of from about 30 to about 60, or of about 30, 35, 40, 45, 50, 55, or about 60, or a combination of any of the foregoing values, or a range encompassing any of the foregoing values.

In another aspect, the conductive rubber compositions can have a Zwick rebound at 100° C. of from about 45 to about 75, or of about 45, 50, 55, 60, 65, 70, or about 75, or a combination of any of the foregoing values, or a range encompassing any of the foregoing values.

In one aspect, Zwick rebound can be measured using standard test methods DIN 53512 for elastomers and rubber, ISO 4662 for rubber, or BS 903.

Final Torque

In an aspect, the disclosed conductive rubber compositions have a final torque measured at 150° C. for 60 min of from about 10 dN·m to about 45 dN·m, or of about 10, 15, 20, 25, 30, 35, 40, or about 45 dN·m, or a combination of any of the foregoing values, or a range encompassing any of the foregoing values. In one aspect, final torque can be measured using a moving die rheometer to perform testing according to ASTM D 5289 and/or ISO 6502.

2 Point Reversion Time

In one aspect, the disclosed conductive rubber compositions have a 2 point reversion time measured at 150° C. for 60 minutes of from about 0.1 min to about 40 min, or of about 0.1, 0.5, 1, 5, 10, 15, 20, 25, 30, 35, or about 40 min, or a combination of any of the foregoing values, or a range encompassing any of the foregoing values. In one aspect, 2 point reversion time can be measured using a moving die rheometer to perform testing according to ASTM D 5289 and/or ISO 6502.

Exemplary methods for evaluating the properties of the disclosed conductive rubbers are provided in the Examples.

Articles Including the Conductive Rubber Compositions

In one aspect, provided herein is an article including the conductive rubber compositions disclosed herein. In another aspect, the article can be a tire, a tire chimney, a wire, a sensor, a hose, an electromagnetic interference shielding gasket, a weather sealing material, an adhesive, or any combination thereof. The conductive rubber compositions described herein possess excellent electrical resistance properties while using lower amounts of the carbon component. The compositions also possess good mechanical properties, which reduces the degradation rate of the articles made therefrom (e.g., tire). Thus, the articles incorporating the conductive compositions described herein possess good electrical and mechanical properties.

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

Aspects

The present disclosure can be described in accordance with the following numbered aspects, which should not be confused with the claims.

Aspect 1. A conductive rubber composition comprising a rubber component and one or more electrically conductive carbon components, wherein the conductive rubber composition has an uncured or cured electrical resistance at 23° C. less than about 10 MΩ when formed into a wire about 10 inches (254 mm) long and 2 mm in diameter.

Aspect 2. The conductive rubber composition of aspect 1, wherein the rubber component comprises natural rubber (NR), polyisoprene rubber (IR), a styrene butadiene rubber (SBR), a polybutadiene rubber (BR), a butyl or halobutyl rubber, an ethylene propylene rubber (EM), an ethylene-propylene diene rubber (EPDM), polychloroprene rubber (CR), a nitrile butadiene rubber (NBR) hydrogenated acrylonitrile butadiene rubber (HNBR), a silicone rubber (MQ), a thermoplastic rubber, or any combination thereof.

Aspect 3. The conductive rubber composition of aspect 2, wherein the butyl or halobutyl rubber comprises isobutylene-isoprene rubber (IIR), brominated isobutylene-isoprene rubber (BIIR), chlorinated isobutylene-isoprene rubber (CIIR), brominated isobutylene-co-p-methylstyrene rubber (BIMS), or any combination thereof.

Aspect 4. The conductive rubber composition of aspect 2, wherein the thermoplastic rubber comprises a poly(styrene-butadiene-styrene) rubber (SBS), a thermoplastic elastomeric rubber (TPE), a melt-processable rubber (MPR), or any combination thereof.

Aspect 5. The conductive rubber composition of aspect 4, wherein the thermoplastic elastomeric rubber comprises a thermoplastic polyurethane rubber (TPU).

Aspect 6. The conductive rubber composition of any one of aspects 2-5, wherein the conductive rubber composition comprises a blend of two or more rubber components.

Aspect 7. The conductive rubber composition of any one of the preceding aspects, wherein the rubber component comprises a molecular weight ($M_w$) of from about $5\times10^4$ Da to about $3\times10^7$ Da.

Aspect 8. The conductive rubber composition of any one of the preceding aspects, wherein the rubber component comprises a molecular weight ($M_w$) of from about $3\times10^5$ Da to about $5\times10^6$ Da.

Aspect 9. The conductive rubber composition of any one of the preceding aspects, wherein the rubber component comprises a Mooney viscosity UML of from about 0.01 to about 150.

Aspect 10. The conductive rubber composition of any one of the preceding aspects, wherein the rubber component comprises a Mooney viscosity UMS of from about 2 to about 150.

Aspect 11. The conductive rubber composition of any one of the preceding aspects, wherein the rubber component comprises a glass transition temperature of from about −110° C. to about −30° C.

Aspect 12. The conductive rubber composition of any one of the preceding aspects, wherein the rubber component comprises a glass transition temperature of from about −75° C. to about −30° C.

Aspect 13. The conductive rubber composition of any one of the preceding aspects, wherein the one or more electrically conductive carbon components comprise carbon black, a short carbon fiber, graphite powder, graphene powder, or any combination thereof.

Aspect 14. The conductive rubber composition of any one of the preceding aspects, wherein the one or more carbon components are present in amount of from about 20 phr to about 150 phr.

Aspect 15. The conductive rubber composition of aspect 14, wherein the one or more carbon components are present in an amount of from about 30 phr to about 100 phr.

Aspect 16. The conductive rubber composition of aspect 14, wherein the one or more carbon components are present in an amount of from about 40 phr to about 80 phr.

Aspect 17. The conductive rubber composition of any one of aspects 13-16, wherein the one or more carbon components comprise carbon black having an average particle size of from about 5 nm to about 100 nm.

Aspect 18. The conductive rubber composition of aspect 17, wherein the one or more carbon components comprise carbon black having an average particle size of from about 5 nm to about 50 nm.

Aspect 19. The conductive rubber composition of any one of the preceding aspects, wherein the rubber component comprises a molecular weight distribution ($M_w/M_n$) of from about 2.1 to about 10.

Aspect 20. The conductive rubber composition of any one of the preceding aspects, wherein the rubber component comprises a molecular weight distribution ($M_w/M_n$) of from about 3.9 to about 8.2.

Aspect 21. The conductive rubber composition of any one of aspects 13-20, wherein the one or more carbon components comprise carbon black having a BET surface area of from about 20 $m^2/g$ to about 1700 $m^2/g$.

Aspect 22. The conductive rubber composition of aspect 21, wherein the one or more carbon components comprise carbon black having a BET surface area of from about 50 $m^2/g$ to about 1500 $m^2/g$.

Aspect 23. The conductive rubber composition of any one of aspects 13-22, wherein the one or more carbon components comprise carbon black having an external surface area based on statistical thickness method (STSA) of from about 20 $m^3/g$ to about 1200 $m^3/g$.

Aspect 24. The conductive rubber composition of aspect 23, wherein the one or more carbon components comprise carbon black having an external surface area based on statistical thickness method (STSA) of from about 100 $m^3/g$ to about 300 $m^3/g$.

Aspect 25. The conductive rubber composition of any one of aspects 13-24, wherein the one or more carbon components comprise carbon black having an oil absorption number (OAN) of from about 500 mL/100 g to about 80 mL/100 g.

Aspect 26. The conductive rubber composition of aspect 25, wherein the one or more carbon components comprise carbon black having an oil absorption number (OAN) of from about 500 mL/100 g to about 100 mL/100 g.

Aspect 27. The conductive rubber composition of any one of aspects 13-26, wherein the short carbon fiber comprises a carbon fiber, chopped carbon fiber yarn, multi-walled carbon nanotubes (MWCNTs), single-walled carbon nanotubes (SWCNTs), or any combination thereof.

Aspect 28. The conductive rubber composition of aspect 27, wherein the short carbon fiber has a diameter of from about 1 nm to about 1000 nm.

Aspect 29. The conductive rubber composition of aspect 28, wherein the short carbon fiber has a diameter of from about 150 nm to about 600 nm.

Aspect 30. The conductive rubber composition of any one of aspects 27-29, wherein the short carbon fiber has a length of from about 1 μm to about $1\times10^4$ μm.

Aspect 31. The conductive rubber composition of any one of aspects 28-30, wherein the short carbon fiber has an average lateral length to thickness ratio of from about 10:1 to about 10,000:1.

Aspect 32. The conductive rubber composition of any one of aspects 13-31, wherein the one or more carbon components comprise a blend of carbon black and graphite powder.

Aspect 33. The conductive rubber composition of any one of aspects 13-31, wherein the one or more carbon components comprise a blend of carbon black and graphene powder.

Aspect 34. The conductive rubber composition of any one of aspects 13-31, wherein the one or more carbon components comprise a blend of carbon black and a short carbon fiber.

Aspect 35. The conductive rubber composition of aspect 34, wherein, in the blend, the short carbon fiber is from about 5 phr to about 80 phr and the carbon black is from about 15 phr to about 70 phr.

Aspect 36. The conductive rubber composition of aspect 34, wherein, in the blend, the short carbon fiber is from about 20 phr to about 40 phr and the carbon black is from about 10 phr to about 60 phr.

Aspect 37. The conductive rubber composition of any one of the preceding aspects, further comprising at least one antioxidant, at least one antiozonant, or any combination thereof.

Aspect 38. The conductive rubber composition of aspect 37, wherein the antioxidant comprises an amine antioxidant, a diphenylamine antioxidant, a polymeric dihydroquinoline, or any combination thereof.

Aspect 39. The conductive rubber composition of aspect 37 or 38, wherein the antioxidant is present in an amount of from about 1 phr to about 2 phr.

Aspect 40. The conductive rubber composition of any one of the preceding aspects, further comprising at least one additional component selected from an oil, zinc oxide, a fatty acid, sulfur, an accelerator, a retarder, or any combination thereof.

Aspect 41. The conductive rubber composition of aspect 40, wherein the oil comprises an aromatic rubber process oil, a paraffinic rubber process oil, a naphthenic rubber process oil, or any combination thereof.

Aspect 42. The conductive rubber composition of aspect 40 or 41, wherein the oil is present in an amount of from about 4 phr to about 30 phr.

Aspect 43. The conductive rubber composition of aspect 40, wherein the zinc oxide is present in an amount of about 3 phr.

Aspect 44. The conductive rubber composition of aspect 40, wherein the fatty acid comprises stearic acid, palmitic acid, oleic acid, or any combination thereof.

Aspect 45. The conductive rubber composition of aspect 40 or 44 wherein the fatty acid is present in an amount of from about 1 phr to about 5 phr.

Aspect 46. The conductive rubber composition of aspect 40, wherein the sulfur is present in an amount of from about 0.5 phr to about 5 phr.

Aspect 47. The conductive rubber composition of aspect 40, wherein the accelerator comprises a sulfenamide.

Aspect 48. The conductive rubber composition of aspect 40 or 47, wherein the accelerator is present in an amount of from about 0.5 phr to about 5 phr.

Aspect 49. The conductive rubber composition of aspect 40, wherein the retarder comprises N-(cyclohexylthio) phthalimide.

Aspect 50. The conductive rubber composition of aspect 40 or 49, wherein the retarder is present in an amount of from about 0.05 phr to about 0.5 phr.

Aspect 51. The conductive rubber composition of any one of aspects 1-50, wherein the rubber component comprises a natural rubber having a molecular weight of from about $3\times10^4$ Da to about $3\times10^7$ Da and a glass transition temperature of from about −75° C. to about −65° C.

Aspect 52. The conductive rubber composition of any one of aspects 1-50, wherein the rubber component comprises a synthetic cis-1,4-polyisoprene rubber having a molecular weight of from about $2\times10^5$ Da to about $8\times10^5$ Da, a Mooney viscosity UML of about 75, and a glass transition temperature of from about −70° C. to about −60° C.

Aspect 53. The conductive rubber composition of any one of aspects 1-50, wherein the rubber component comprises an emulsion-polymerized styrene-butadiene rubber having a molecular weight of from about $1\times10^5$ Da to about $4\times10^5$ Da, a Mooney viscosity of about 50 UML, and a glass transition temperature of from about −60° C. to about −50° C.

Aspect 54. The conductive rubber composition of any one of aspects 1-50, wherein the rubber component comprises a solution-polymerized styrene-butadiene rubber having a molecular weight of from about $7\times10^4$ Da to about $8\times10^4$ Da, a Mooney viscosity UML of about 2.6, and a glass transition temperature of from about −30° C. to about −20° C.

Aspect 55. The conductive rubber composition of any one of aspects 1-50, wherein the electrically conductive carbon component comprises a carbon black having an average particle size of from about 5 nm to about 100 nm.

Aspect 56. The conductive rubber composition of any one of aspects 1-50, wherein the electrically conductive carbon component comprises a carbon black having an average particle size of from about 5 nm to about 50 nm and an average surface area of from about 20 m$^2$/g to about 1500 m$^2$/g.

Aspect 57. The conductive rubber composition of any one of aspects 1-50, wherein the electrically conductive carbon component comprises an ASTM N299 grade carbon black and a short carbon fiber having a diameter from about 1 nm to about 1000 nm and a length of from about 1 μm to about $1\times10^4$ μm.

Aspect 58. The conductive rubber composition of any one of aspects 1-50, wherein the electrically conductive carbon component comprises a carbon black having an oil absorption number of about 100 mL/100 g and a short carbon fiber having a diameter of from about 1 nm to about 1000 nm and a length of from about 1 μm to about $1\times10^4$ μm.

Aspect 59. The conductive rubber composition of any one of aspects 1-50, wherein the electrically conductive carbon component comprises a carbon black having an average particle size of about 30 nm and a short carbon fiber having a diameter of from about 1 nm to about 1000 nm and a length of from about 1 μm to about $1\times10^4$ μm.

Aspect 60. The conductive rubber composition of any one of the preceding aspects, wherein the conductive rubber composition has an uncured storage modulus at 15% strain, 100° C., and 0.83 Hz of from about 185 kPa to about 1100 kPa.

Aspect 61. The conductive rubber composition of any one of the preceding aspects, wherein the conductive rubber composition has a storage modulus at 1% strain, 100° C., and 11 Hz of from about 1.1 MPa to about 4 MPa.

Aspect 62. The conductive rubber composition of any one of the preceding aspects, wherein the conductive rubber composition has a storage modulus at 10% strain, 100° C., and 11 Hz of from about 0.8 MPa to about 3 MPa.

Aspect 63. The conductive rubber composition of any one of the preceding aspects, wherein the conductive rubber composition has a storage modulus at 50% strain, 100° C., and 11 Hz of from about 0.35 MPa to about 1 MPa.

Aspect 64. The conductive rubber composition of any one of the preceding aspects, wherein the conductive rubber composition has a 10% modulus of from about 0.4 MPa to about 2.5 MPa.

Aspect 65. The conductive rubber composition of any one of the preceding aspects, wherein the conductive rubber composition has a 50% modulus of from about 1.25 MPa to about 3.5 MPa.

Aspect 66. The conductive rubber composition of any one of the preceding aspects, wherein the conductive rubber composition has a 100% modulus of from about 2 MPa to about 5.2 MPa.

Aspect 67. The conductive rubber composition of any one of the preceding aspects, wherein the conductive rubber composition has a 200% modulus of from about 3 MPa to about 12 MPa.

Aspect 68. The conductive rubber composition of any one of the preceding aspects, wherein the conductive rubber composition has a 300% modulus of from about 4 MPa to about 13.5 MPa.

Aspect 69. The conductive rubber composition of any one of the preceding aspects, wherein the conductive rubber composition has a tensile strength of above about 2 MPa.

Aspect 70. The conductive rubber composition of any one of the preceding aspects, wherein the conductive rubber composition has a tensile strength of from about 4.5 MPa to about 30 MPa.

Aspect 71. The conductive rubber composition of any one of the preceding aspects, wherein the conductive rubber composition has an elongation at break above about 200%.

Aspect 72. The conductive rubber composition of any one of the preceding aspects, wherein the conductive rubber composition has an elongation at break of from about 300% to about 800%.

Aspect 73. The conductive rubber composition of any one of the preceding aspects, wherein the conductive rubber composition has an electrical resistance at 23° C. of from about 5Ω to about 10 MΩ when formed into a wire about 10 inches (254 mm) long and 2 mm in diameter when the conductive rubber composition is cured or uncured.

Aspect 74. The conductive rubber composition of any one of the preceding aspects, wherein the conductive rubber composition has an electrical resistance at 23° C. of from about 5Ω to about 100 kΩ when formed into a wire about 10 inches (254 mm) long and 2 mm in diameter when the conductive rubber composition is cured or uncured.

Aspect 75. The conductive rubber composition of any one of the preceding aspects, wherein the conductive rubber composition has a T25 of from about 1 min to about 30 min when measured using a moving die rheometer standard test at 150° C. for 60 min.

Aspect 76. The conductive rubber composition of any one of the preceding aspects, wherein the conductive rubber composition has a T90 of from about 5 min to about 60 min when measured using a moving die rheometer standard test at 150° C. for 60 min.

Aspect 77. The conductive rubber composition of any one of the preceding aspects, wherein the conductive rubber composition has a Zwick rebound at 23° C. of from about 30 to about 60.

Aspect 78. The conductive rubber composition of any one of the preceding aspects, wherein the conductive rubber composition has a Zwick rebound at 100° C. of from about 45 to about 75.

Aspect 79. The conductive rubber composition of any one of the preceding aspects, wherein the conductive rubber composition has a final torque of from about 10 dN·m to about 45 dN·m when measured at 150° C. for 60 min.

Aspect 80. The conductive rubber composition of any one of the preceding aspects, wherein the conductive rubber composition exhibits a 2 pt reversion time of from about 0.1 min to about 40 min when measured at 150° C. for 60 min.

Aspect 81. An article comprising the conductive rubber composition of any one of aspects 1-77.

Aspect 82. The article of aspect 81, wherein the article comprises a tire, a tire chimney, a wire, a sensor, a hose, an electromagnetic interference shielding gasket, a weather sealing material, an adhesive, or any combination thereof.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Property Analysis and Characterization Procedures

Mooney Viscosity ML (for a large rotor) or MS (for a small rotor) was determined at 100° C. using standard test method ASTM D 1646.

A Rubber Process Analyzer (RPA) was used to determine the following: uncured storage modulus G' at 15% strain, 100° C. and 0.83 Hz; T25; T90; Storage Modulus G' (1%, 10%, and 50%) at 100° C. and 11 Hz; and Tan Delta (10%) at 100° C. and 1 Hz.

A Moving Die Rheometer (MDR) Standard Test Method for Rubber Property Vulcanization Using Rotorless Cure Meters based on standard test methods ASTM D 5289 and ISO 6502 was used to measure maximum and minimum torque, delta torque, final torque, time for 1 pt rise, T25, T90, and 2 pt reversion. The test was conducted at 150° C. for 60 min.

A tensile test (Die C) at 23° C. based on standard test method ASTM D 412 was used to measure 10%, 50%, 100%, 200%, and 300% modulus, tensile strength, and elongation at break.

External surface area based on statistical thickness method (STSA) is measured according to standard test method ASTM D 6556.

A Fluke 117 True RMS Multimeter was used to measure electrical resistance of uncured rubber wires at 23° C. A typical wire used for the test was 10 in (254 mm) long and 2 mm in diameter. In this test, a result of "OL" indicates an opened line where resistance cannot be measured.

Zwick rebound at 23° C. and 100° C. was measured using standard test method DIN 53512 for elastomers and rubber, ISO 4662 (for rubber), and/or BS 903.

Example 2: Exemplary Compositions and Properties Thereof

Exemplary conductive rubber compositions using carbon black as the conductive carbon compound are provided in Table 1.

TABLE 1

Exemplary Conductive Rubber Compositions[a]

| Component | Control A | #1 | #2 | #3 | #4 | #5 |
|---|---|---|---|---|---|---|
| TSR20 Natural Rubber[b] | 100 | | | | | |
| RSS Natural Rubber[c] | | 100 | | | | |
| Natsyn2200[d] | | | 100 | | | |
| PLF1502[e] | | | | 100 | | |
| Exp SBR[f] | | | | | 100 | 100 |
| Carbon Black A[g] | 40 | | | | | |
| Carbon Black C[h] | | 50 | 50 | 50 | 50 | 80 |
| Antioxidants | 1 | 2 | 2 | 2 | 2 | 2 |
| Oil[i] | 4 | 20 | 20 | 20 | 20 | 30 |
| Zinc Oxide | 3 | 3 | 3 | 3 | 3 | 3 |
| Fatty Acid[j] | 2 | 2 | 2 | 2 | 2 | 2 |
| Sulfur | 1.8 | 1.8 | 1.8 | 1.8 | 1.8 | 1.8 |
| Accelerator(s)[k] | 1.2 | 1.2 | 1.2 | 1.2 | 1.2 | 1.2 |
| Retarder | 0.1 | 0.1 | 0.1 | 0.2 | 0.2 | 0.2 |

[a]All amounts provided in units of parts per hundred rubber (phr).
[b]TSR20 Natural Rubber consists primarily of cis-1,4-polyisoprene and has a $T_g$ of −70° C. with 20% max Dirt.
[c]RSS Natural Rubber is a #2 Ribbed Smoked Sheet (#2 RSS) Natural Rubber with $T_g$ of −70° C.
[d]Natsyn2200 is synthetic cis-1,4-polyisoprene with a $T_g$ of −64° C.
[e]PLF1502 is an emulsion polymerization of styrene-butadiene rubber having about 23.5% styrene, 12% vinyl, 55% trans, 10% cis, and $T_g$ of −55° C.
[f]Exp SBR is an experimental Li-solution SBR with $T_g$ of −26° C.
[g]Carbon Black A is an N299 ASTM grade carbon black.
[h]Carbon Black C is commercially available from Orion Engineered Carbons as PRINTEX XE2B.
[i]The oil is a standard rubber processing oil.
[j]The fatty acid is a mixture of stearic acid, palmitic acid, and oleic acid.
[k]The accelerator is a sulfenamide sulfur cure accelerator.

Properties of the compositions using carbon black as the conductive carbon compound are provided in Table 2.

TABLE 2

Properties of Exemplary Conductive Rubber Compositions

| Property | Units | Control A | #1 | #2 | #3 | #4 | #5 |
|---|---|---|---|---|---|---|---|
| Mooney Viscosity ML | | 99.2 | | 75 | 50 | 2.63 | 2.63 |
| Mooney Viscosity MS | | | 142 | | | | |
| Uncured Storage Modulus (G') at 15% Strain, 100° C., 0.83 Hz | kPa | 187 | 527 | 488 | 584 | 358 | 1099 |
| T25 | min | 1.43 | 0.99 | 0.91 | 0.91 | 0.09 | 0.82 |
| T25 | Min | 1.82 | 6.11 | 7.93 | 4.88 | 1.15 | 2.17 |
| T90 | Min | 2.17 | 19.32 | 21.99 | 27.57 | 27.85 | 21.74 |
| Storage Modulus (G'), 1%, at 100° C., 11 Hz | MPa | 1.17 | 3.18 | 3.67 | 3.66 | 3.40 | 1.16 |
| Storage Modulus (G'), 10%, at 100° C., 11 Hz | MPa | 0.82 | 1.82 | 1.90 | 1.65 | 1.05 | 2.55 |
| Storage Modulus (G'), 50%, at 100° C., 11 Hz | MPa | 0.55 | 0.97 | 0.94 | 0.74 | 0.35 | 0.65 |
| Tan Delta (10%) at 100° C., 1 Hz | | 0.13 | 0.16 | 0.19 | 0.29 | 0.54 | 0.73 |
| Max Torque | dN-m | 16.95 | 23.93 | 26.97 | 28.99 | 19.36 | 41.62 |
| Min Torque | dN-m | 2.39 | 7.61 | 8.76 | 9.11 | 7.37 | 26.87 |
| Delta Torque | dN-m | 14.56 | 16.32 | 18.21 | 19.88 | 11.99 | 14.75 |
| Final Torque | dN-m | 13.78 | 22.37 | 25.8 | 28.99 | 19.35 | 41.62 |
| Time 1 Pt Rise | min | 5.55 | 0.23 | 0.18 | 0.33 | 18.72 | 0.2 |
| T25 | min | 7.21 | 4.79 | 4.11 | 12.18 | 25.46 | 5.1 |
| T90 | min | 10.94 | 18.03 | 20.18 | 42.19 | 52.68 | 48.06 |
| 2 Pt Reversion | min | 39.48 | 0.16 | 0.14 | 0.23 | 11.02 | 0.17 |
| 10% Modulus | MPa | 0.5 | 1.0 | 0.9 | 1.1 | 1.1 | 2.3 |
| 50% Modulus | MPa | 1.3 | 1.8 | 1.6 | 1.7 | 1.6 | 3.5 |
| 100% Modulus | MPa | 2.5 | 2.9 | 2.5 | 2.5 | 2.0 | 4.0 |
| 200% Modulus | MPa | 7.0 | 6.2 | 5.0 | 5.1 | 3.0 | 4.9 |
| 300% Modulus | MPa | 13.2 | 11.1 | 8.3 | 8.6 | 4.0 | 5.8 |
| Tensile Strength | MPa | 26.3 | 18.4 | 16.7 | 21.6 | 4.7 | 6.1 |
| Elongation at Break | % | 490 | 433 | 507 | 591 | 392 | 343 |
| Electrical Resistance at 23° C. | kΩ | OL[a] | 5.5 | 4.0 | 4.1 | 4.0 | 1.3 |

[a]OL (opened line) indicates measurement could not be completed.

Exemplary compositions using a combination of carbon black and a short carbon fiber as the conductive carbon compound are provided in Table 3.

TABLE 3

Exemplary Conductive Rubber Compositions[a]

| Component[b] | Conductive Rubber Composition | | | |
|---|---|---|---|---|
| | Control B | #6 | #7 | #8 |
| Natsyn2200[b] | | | 100 | 100 |
| TSR20 Natural Rubber[b] | 100 | 100 | | |
| Carbon Black A[b] | 40 | 30 | | |
| Carbon Black B[c] | | | 40 | |
| Carbon Black C[b] | | | | 40 |
| Short Carbon Fiber[d] | | 40 | 40 | 40 |
| Antioxidants | 1 | 1 | 1 | 1 |
| Oil[b] | 4 | 4 | 15 | 22 |
| Zinc Oxide | 3 | 3 | 3 | 3 |
| Fatty Acid[b] | 1 | 1 | 1 | 1 |
| Sulfur | 1.8 | 1.8 | 1.8 | 1.8 |
| Accelerator(s)[b] | 1.2 | 1.2 | 1.2 | 1.2 |
| Retarder | 0.1 | 0.1 | 0.2 | 0.2 |

[a]All amounts provided in units of parts per hundred rubber (phr).
[b]Refer to footnotes to Table 1 for further information on component.
[c]Carbon Black B is commercially available from Cabot Corporation as PROPEL X22.
[d]Short carbon fiber has a diameter ranging from 150-600 nm and a length of greater than 1 μm.

Properties of the compositions using a combination of carbon black and a short carbon fiber as the conductive carbon compound are provided in Table 4.

TABLE 4

Properties of Exemplary Conductive Rubber Compositions

| Property | Units | Conductive Rubber Composition | | | |
|---|---|---|---|---|---|
| | | Control B | #6 | #7 | #8 |
| Uncured Storage Modulus (G') at 15% Strain, 100° C., 0.83 Hz | kPa | 0.187 | 0.313 | 0.248 | 0.596 |
| T25 | min | 1.43 | 1.36 | 1.72 | 1.56 |
| T25 | Min | 1.82 | 1.63 | 2.01 | 2.05 |
| T90 | Min | 2.17 | 1.95 | 2.38 | 2.58 |
| Storage Modulus (G'), 1%, at 100° C., 11 Hz | MPa | 1.174 | 1.673 | 1.977 | 3.973 |
| Storage Modulus (G'), 10%, at 100° C., 11 Hz | MPa | 0.818 | 1.111 | 0.968 | 1.504 |
| Storage Modulus (G'), 50%, at 100° C., 11 Hz | MPa | 0.551 | 0.685 | 0.533 | 0.565 |
| Tan Delta (10%) at 100° C., 1 Hz | | 0.127 | 0.155 | 0.228 | 0.388 |
| Max Torque | dN · m | 16.95 | 19.19 | 26.07 | 19.76 |
| Min Torque | dN · m | 2.39 | 3.12 | 8.61 | 4.26 |
| Delta Torque | dN · m | 14.56 | 16.07 | 17.46 | 15.5 |
| Final Torque | dN · m | 13.78 | 14.74 | 24.25 | 15.73 |
| Time 1 Pt Rise | min | 5.55 | 2.38 | 0.22 | 5.12 |
| T25 | min | 7.21 | 3.86 | 0.99 | 6.69 |
| T90 | min | 10.94 | 7.11 | 14.74 | 11.16 |
| 2 Pt Reversion | min | 39.48 | 27.52 | | 36.03 |
| 23° C. Zwick Rebound | | 60 | 55 | 39 | 32 |
| 100° C. Zwick Rebound | | 74 | 69 | 57 | 47 |
| 10% Modulus | MPa | 0.46 | 0.71 | 0.59 | 0.81 |
| 50% Modulus | MPa | 1.28 | 2.31 | 1.48 | 1.76 |
| 100% Modulus | MPa | 2.48 | 5.19 | 2.91 | 3.12 |
| 200% Modulus | MPa | 7.02 | 11.56 | 6.43 | 6.43 |
| 300% Modulus | MPa | 13.22 | 17.2 | 10.01 | 10.05 |
| Tensile Strength | MPa | 26.32 | 18.02 | 15.32 | 13.44 |
| Elongation at Break | % | 490 | 318 | 437 | 390 |
| Electrical Resistance at 23° C. | kΩ | OL[a] | 7500 | 130 | 2.6 |

[a]OL (opened line) indicates measurement could not be completed.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A conductive rubber composition comprising a rubber component and one or more electrically conductive carbon components, wherein:
   the conductive rubber composition includes an uncured or cured electrical resistance at 23° C. less than about 10 MΩ when formed into a wire about 10 inches (254 mm) long and 2 mm in diameter, and the conductive rubber composition comprises a blend of two or more rubber components;
   the one or more electrically conductive carbon components comprise a blend of carbon black and a short carbon fiber, wherein the short carbon fiber is free of carbon nanotubes; and
   the short carbon fiber is from about 5 phr to about 80 phr and the carbon black is from about 15 phr to about 70 phr.

2. The conductive rubber composition of claim 1, wherein the rubber component comprises natural rubber (NR), polyisoprene rubber (IR), a styrene butadiene rubber (SBR), a polybutadiene rubber (BR), a butyl or halobutyl rubber, an ethylene propylene rubber (EM), an ethylene-propylene diene rubber (EPDM), polychloroprene rubber (CR), a nitrile butadiene rubber (NBR) hydrogenated acrylonitrile butadiene rubber (HNBR), a silicone rubber (MQ), a thermoplastic rubber, or any combination thereof.

3. The conductive rubber composition of claim 2, wherein the butyl or halobutyl rubber comprises isobutylene-isoprene rubber (IIR), brominated isobutylene-isoprene rubber (BIIR), chlorinated isobutylene-isoprene rubber (CIIR), brominated isobutylene-co-p-methylstyrene rubber (BIMS), or any combination thereof.

4. The conductive rubber composition of claim 1, wherein the rubber component comprises a molecular weight ($M_w$) of from about $5 \times 10^4$ Da to about $3 \times 10^7$ Da.

5. The conductive rubber composition of claim 1, wherein the rubber component comprises a Mooney viscosity UML of from about 0.01 to about 150 or a Mooney viscosity UMS of from about 2 to about 150.

6. The conductive rubber composition of claim 1, wherein the rubber component comprises a glass transition temperature of from about −110° C. to about 30° C.

7. The conductive rubber composition of claim 1, wherein the rubber component comprises a molecular weight distribution ($M_w/M_n$) of from about 1 to about 10.

8. The conductive rubber composition of claim 1, wherein the carbon black includes an average particle size of from about 5 nm to about 100 nm and a BET surface area of from about 20 $m^2/g$ to about 1700 $m^2/g$.

9. The conductive rubber composition of claim 1, wherein the short carbon fiber has a diameter of from about 1 nm to about 1000 nm and a length of from about 1 μm to about $1 \times 10^4$ μm.

10. The conductive rubber composition of claim 1, further comprising at least one additional component selected from an antioxidant, an antiozonant, an oil, zinc oxide, a fatty acid, sulfur, an accelerator, a retarder, or any combination thereof.

11. The conductive rubber composition of claim 1, wherein the conductive rubber composition has a tensile strength of from about 2 MPa to about 30 MPa.

12. The conductive rubber composition of claim 1, wherein the conductive rubber composition has an elongation at break of from about 200% to about 800%.

13. An article comprising the conductive rubber composition of claim 1.

14. The article of claim 13, wherein the article comprises a tire, a tire chimney, a wire, a sensor, a hose, an electromagnetic interference shielding gasket, a weather sealing material, an adhesive, or any combination thereof.

* * * * *